US012723650B1

(12) United States Patent
Cross et al.

(10) Patent No.: US 12,723,650 B1
(45) Date of Patent: Sep. 1, 2026

(54) NEUTRAL COAST INHIBIT SYSTEM AND METHOD FOR TRANSMISSIONS

(71) Applicant: ALLISON TRANSMISSION, INC., Indianapolis, IN (US)

(72) Inventors: Logan Cross, Lebanon, IN (US); Jeffery Shultz, Zionsville, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 19/239,289

(22) Filed: Jun. 16, 2025

(51) Int. Cl.
*F16H 61/16* (2006.01)
*B60K 35/21* (2024.01)

(52) U.S. Cl.
CPC ............ *F16H 61/16* (2013.01); *B60K 35/21* (2024.01); *F16H 2061/165* (2013.01)

(58) Field of Classification Search
CPC ..... F16H 61/16; F16H 61/18; F16H 2061/165
See application file for complete search history.

(56) References Cited

U.S. PATENT DOCUMENTS 5,211,082 A * 5/1993 Sasaki ..................... F16H 61/16 475/122
7,957,873 B2 6/2011 Cawthorne et al.
8,548,696 B2 * 10/2013 Jerger ..................... F16H 61/24 701/1
8,862,345 B2 10/2014 Swartling et al.
11,085,528 B2 8/2021 McGuire et al.
11,572,069 B2 2/2023 Harper et al.
12,104,664 B2 10/2024 Vernekar et al.
12,115,970 B2 10/2024 Ademane et al.
2007/0015627 A1 * 1/2007 Hinami ................... F16H 61/16 477/97
2010/0179737 A1 7/2010 Eriksson et al.
2015/0219209 A1 * 8/2015 Turner ................ F16H 61/0206 74/473.11
2020/0124165 A1 4/2020 Lotz et al.
2020/0309257 A1 * 10/2020 Park ........................ F16H 61/24

FOREIGN PATENT DOCUMENTS

KR 19980012650 U * 6/1998 ............. F16H 59/44
WO 2024227842 A1 11/2024

OTHER PUBLICATIONS

Viet, Gear shift strategies for automotive transmissions, Eindhoven University of Technology, 2012.

* cited by examiner

*Primary Examiner* — Ernesto A Suarez
*Assistant Examiner* — Lillian T Nguyen
(74) *Attorney, Agent, or Firm* — Taft Stettinius & Hollister LLP; Stephen F. Rost

(57) ABSTRACT

Transmissions and methods of selectively overriding a neutral transmission operating range requested by an operator are disclosed. A transmission includes an input shaft to receive torque from a drive unit, an output shaft to transmit torque to a load, and a control system. The control system includes an output speed sensor to provide an input signal indicative of a rotational speed of the output shaft, a shift selector to provide an input signal indicative of a requested operational range of the transmission, and a controller communicatively coupled to the output speed sensor and the shift selector.

10 Claims, 6 Drawing Sheets

NEUTRAL COAST INHIBIT SYSTEM AND METHOD FOR TRANSMISSIONS

FIELD OF THE DISCLOSURE

The present disclosure relates, generally, to control systems for transmissions, and, more specifically, to transmission control systems incorporating a sensor to measure rotational speed of a transmission output shaft.

BACKGROUND

In some configurations, selection of a neutral transmission operating range to allow a vehicle to coast on a downhill grade may be associated with excessively high output speeds at the transmission output shaft. To avoid transmission hardware damage, it may be desirable to employ overspeed protections. In one example, one or more hydraulic blocking mechanism(s) may be designed to provide such protection. Alternative systems, devices, and/or methods for providing transmission overspeed protection that avoid drawbacks associated with previous configurations remain an area of interest.

SUMMARY

The present disclosure may comprise one or more of the following features and combinations thereof.

According to one aspect of the present disclosure, a transmission may include an input shaft to receive torque from a drive unit, an output shaft to transmit torque to a load, and a control system. The control system may include an output speed sensor to provide an input signal indicative of a rotational speed of the output shaft, a shift selector to provide an input signal indicative of a requested operational range of the transmission, and a controller communicatively coupled to the output speed sensor and the shift selector. The controller may include a processor and memory having instructions stored therein that are executable by the processor to cause the processor to receive the input signals provided by the output speed sensor and the shift selector, to determine whether the rotational speed of the output shaft is greater than a reference rotational speed based on the input signal provided by the output speed sensor, to determine, in response to a determination that the rotational speed of the output shaft is greater than the reference rotational speed, whether the requested operational range is a neutral range or a reverse range based on the input signal provided by the shift selector, and to override, in response to a determination that the requested operational range is a neutral range or a reverse range, the requested operational range with a forward range selection.

In some embodiments, the instructions may be executable by the processor to cause the processor to, in response to the determination that the requested operational range is a neutral range or a reverse range, intercept the input signal provided by the shift selector indicative of the requested neutral or reverse range.

In some embodiments, the instructions may be executable by the processor to cause the processor to, in response to the determination that the requested operational range is a neutral range or a reverse range, intercept a pulse-width modulation representation of the input signal provided by the shift selector indicative of the requested neutral or reverse range.

In some embodiments, the instructions may be executable by the processor to cause the processor to, in response to the determination that the requested operational range is a neutral range, flash "N" on the shift selector when the input signal provided by the shift selector is indicative of the requested neutral range.

In some embodiments, the instructions may be executable by the processor to cause the processor to, in response to the determination that the requested operational range is a reverse range, flash "R" on the shift selector when the input signal provided by the shift selector is indicative of the requested reverse range.

In some embodiments, the instructions may be executable by the processor to cause the processor to, in response to a determination that the requested operational range is not a neutral range or a reverse range, allow the input signal provided by the shift selector to pass through without being overridden.

In some embodiments, the reference rotational speed may be at least 600 rpm.

In some embodiments, the instructions may be executable by the processor to cause the processor to, in response to a determination that the rotational speed of the output shaft is not greater than the reference rotational speed, allow the input signal provided by the shift selector to pass through without being overridden.

In some embodiments, the instructions may be executable by the processor to cause the processor to determine, in response to allowing the input signal provided by the shift selector to pass through, whether a reverse range was selected in a previous operational state in which a neutral coast inhibit system of the transmission was active.

In some embodiments, the instructions may be executable by the processor to cause the processor to, in response to a determination that the reverse range was selected in the previous operational state, inhibit attainment of the reverse range until the processor receives the input signal from the shift selector indicative of re-selection of the reverse range.

According to another aspect of the present disclosure, a transmission may include an input shaft to receive torque from a drive unit, an output shaft to transmit torque to a load, and a control system. The control system may include an output speed sensor to provide an input signal indicative of a rotational speed of the output shaft, a shift selector to provide an input signal indicative of a requested operational range of the transmission, and a controller communicatively coupled to the output speed sensor and the shift selector. The controller may include a processor and memory having instructions stored therein that are executable by the processor to cause the processor to receive the input signals provided by the output speed sensor and the shift selector and to selectively override a requested operational range with a forward range selection based on the input signals provided by the output speed sensor and the shift selector. The instructions may be executable by the processor to cause the processor to selectively override the requested operational range with the forward range selection without utilization of a hydraulic blocking mechanism.

In some embodiments, the requested operational range may be a neutral range or a reverse range.

In some embodiments, the instructions may be executable by the processor to cause the processor to determine whether the rotational speed of the output shaft is greater than a reference rotational speed based on the input signal provided by the output speed sensor.

In some embodiments, the reference rotational speed may be at least 600 rpm.

In some embodiments, the instructions may be executable by the processor to cause the processor to determine, in response to a determination that the rotational speed of the output shaft is greater than the reference rotational speed, whether the requested operational range is a neutral range or a reverse range based on the input signal provided by the shift selector.

In some embodiments, the instructions may be executable by the processor to cause the processor to override, in response to a determination that the requested operational range is a neutral range or a reverse range, the requested operational range with the forward range selection.

According to yet another aspect of the present disclosure, a transmission may include an input shaft to receive torque from a drive unit, an output shaft to transmit torque to a load, and a control system. The control system may include an output speed sensor to provide an input signal indicative of a rotational speed of the output shaft, a shift selector to provide an input signal indicative of a requested operational range of the transmission, and a controller communicatively coupled to the output speed sensor and the shift selector. The controller may include a processor and memory having instructions stored therein that are executable by the processor to cause the processor to receive the input signals provided by the output speed sensor and the shift selector and to selectively override a requested operational range with a forward range selection based on the input signals provided by the output speed sensor and the shift selector. The requested operational range may be a neutral range or a reverse range.

In some embodiments, the instructions may be executable by the processor to cause the processor to determine whether the rotational speed of the output shaft is greater than a reference rotational speed based on the input signal provided by the output speed sensor.

In some embodiments, the instructions may be executable by the processor to cause the processor to, in response to a determination that the rotational speed of the output shaft is not greater than the reference rotational speed, allow the input signal provided by the shift selector to pass through without being overridden.

In some embodiments, the instructions may be executable by the processor to cause the processor to determine, in response to allowing the input signal provided by the shift selector to pass through, whether a reverse range was requested in a previous operational state in which a neutral coast inhibit system of the transmission was active.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
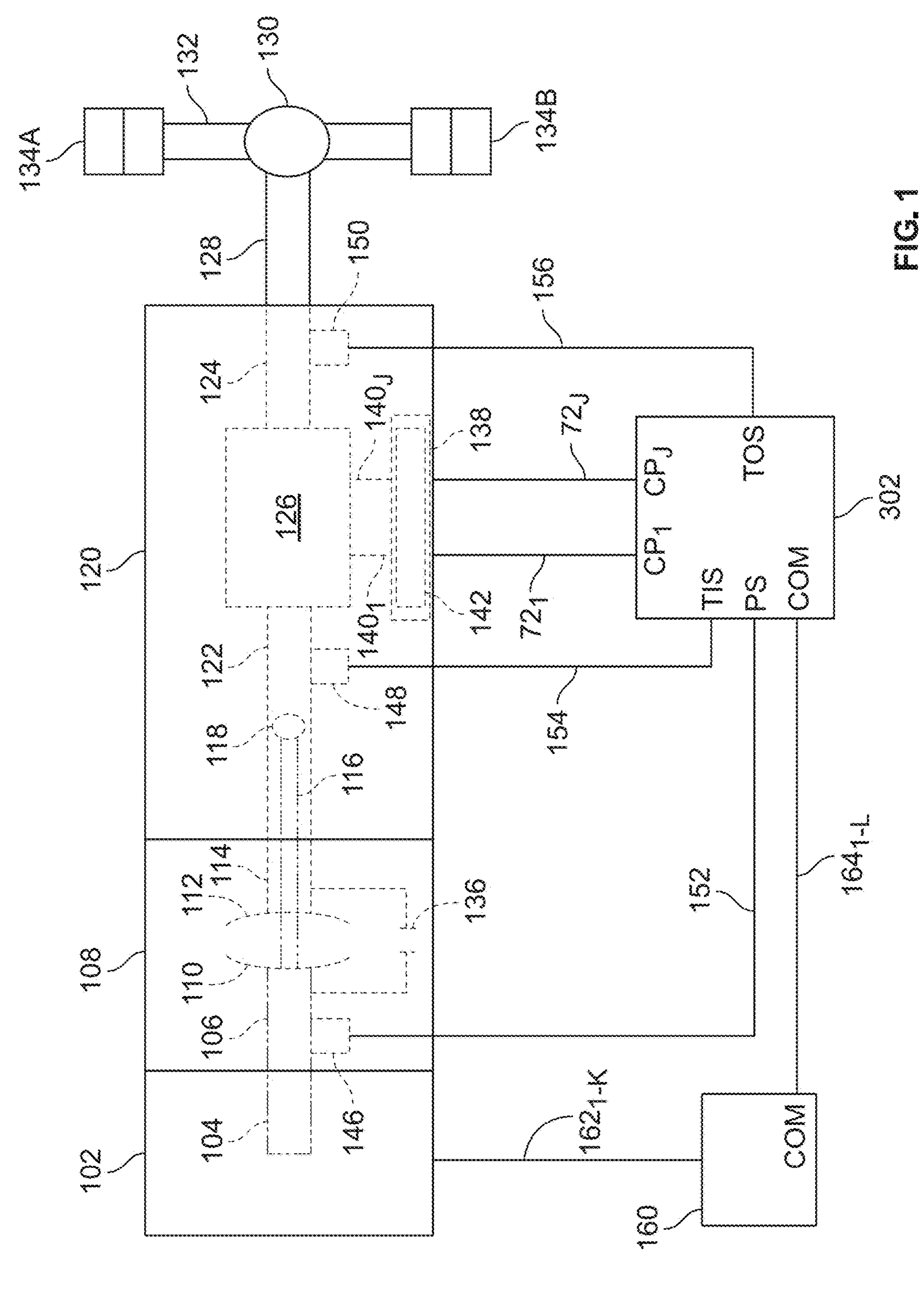
FIG. 1 is a partial diagrammatic depiction of a drive system for a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

In some vehicular configurations, such as vehicular configurations for heavy duty mining applications, for example, an operator may select a neutral transmission operating range to allow the vehicle to coast on downhill grades, thereby subjecting the transmission output shaft to excessively high output speeds. Those output speeds may cause or be associated with transmission hardware damage. In some configurations, hydraulic blocking mechanism(s) may be designed to prevent hardware damage and provide overspeed protection.

In one configuration, a hydraulic blocking mechanism may inhibit and/or prevent selection of a neutral operating range when the attained operating range is greater than a first forward range. In that configuration, when the speed of the transmission output shaft falls below the downshift threshold for the first forward range, the neutral operating range may be selected. It should be appreciated that allowing selection of the neutral range only at low output shaft speeds effects desired transmission hardware overspeed protection.

In the illustrative embodiment of the present disclosure, transmissions may not include the aforementioned hydraulic blocking mechanism(s). Absent an alternative means of overspeed protection, such transmissions may permit shifts to neutral operating ranges at any output speed, thereby exposing the transmissions to hardware damage in the event operators perform shifts to neutral at high output speeds. The present disclosure envisions a software-implemented neutral coast inhibit system (NCIS) to prevent shifts to neutral at high output speeds. In particular, the NCIS is implemented by a transmission control module or transmission control system (i.e., the control system 300).

As discussed in greater detail below, the NCIS inhibits and/or prevents selection of a neutral or reverse transmission operating range in the event the rotational speed of the output shaft exceeds a reference threshold (e.g., 600 rpm). More specifically, to do so, the NCIS overrides and/or intercepts the driver selection so that the selection is not allowed to pass through the software, thereby preventing a shift leading to hardware damage. If the rotational speed of the output shaft falls below the reference threshold, any existing neutral or reverse requests are released to permit the requested shift(s), and any new shift requests are allowed to pass through the software. Compared to other configurations lacking this functionality, the NCIS may provide improved durability and safety, among other advantages.

In the illustrative embodiment, a vehicle (e.g., the vehicle 200 shown in FIG. 2) includes a chassis or main frame 202, wheels 204 coupled to the chassis 202, and a powertrain 210 mounted to the chassis 202. The powertrain 210 is illustratively embodied as, or otherwise includes, a collection of devices that are cooperatively capable of generating and transmitting rotational power to the wheels 204 of the vehicle 200 to propel the vehicle 200 in use thereof. In some embodiments, the powertrain 210 may be mounted to the chassis 202 transverse to a longitudinal axis LA along which the chassis 202 extends. In those embodiments, the powertrain 210 may be arranged transverse to a travel direction TD of the vehicle 200, and the powertrain 210 may be said to have a transverse mounting arrangement relative to the chassis 202. In other embodiments, however, the powertrain 210 may be mounted to the chassis 202 in another suitable manner.

Figure 2:
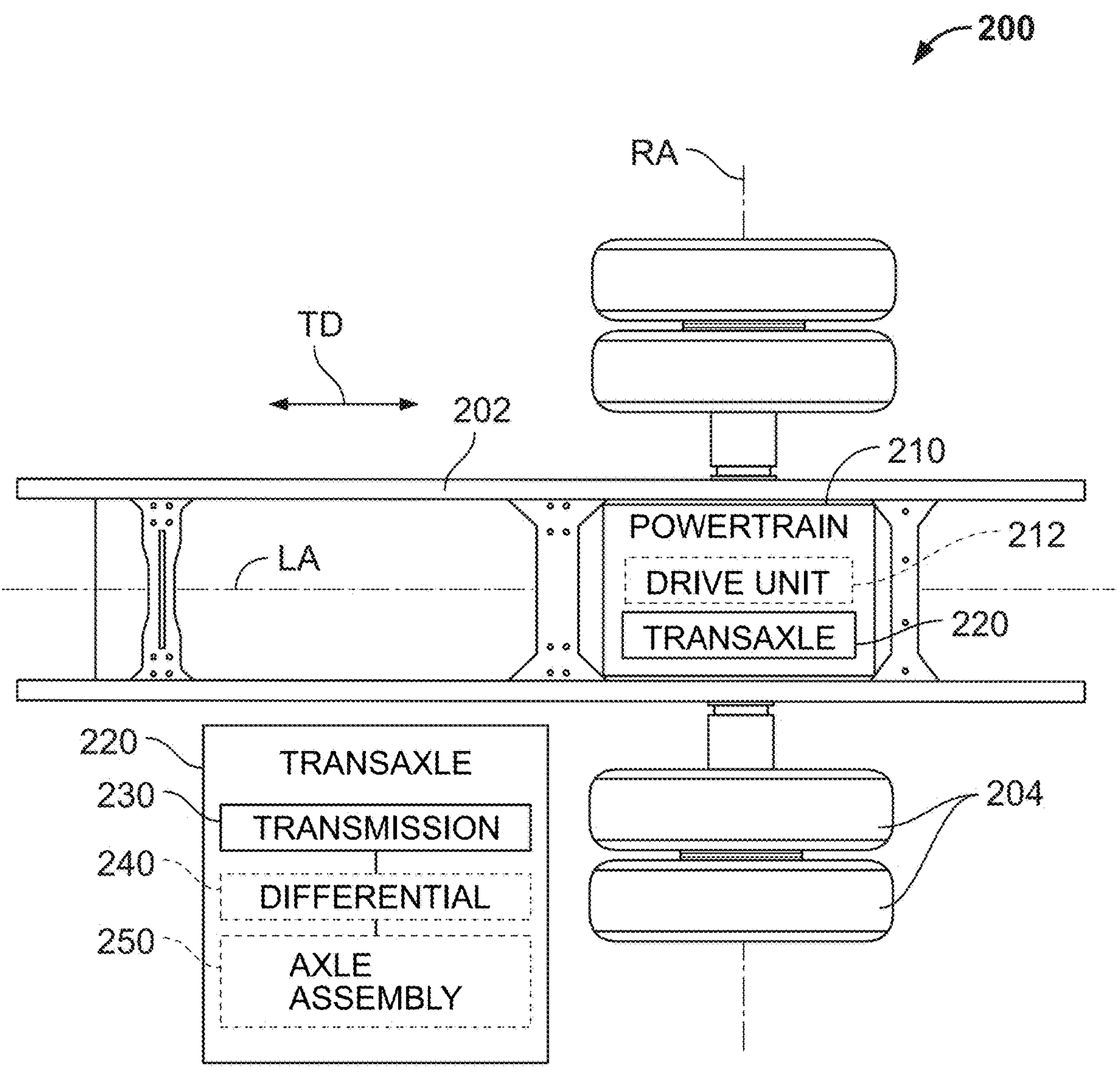
FIG. 2 is a partial diagrammatic depiction of a powertrain for a vehicle.

In any case, in the illustrative embodiment, the powertrain 210 includes a transmission, such as the transmission 230 shown in FIG. 2 and/or the transmission 120 shown in FIG. 1, for example. With reference to FIG. 1, the transmission 120 includes an input shaft 122 to receive torque from a drive unit (e.g., the drive unit 102) and an output shaft 124 to transmit torque to a load (e.g., an axle 132 and wheels 134A, 134B mounted thereto). Additionally, the transmission 120 and/or transmission 230 includes a control system 300 (see FIG. 3) having an output speed sensor 150 to provide an input signal indicative of a rotational speed of the output shaft 124 and a controller 302 communicatively coupled to the output speed sensor 150. The control system 300 also includes a shift selector 308 communicatively coupled to the controller 302 to provide an input signal to the controller 302 indicative of a requested operational range of the transmission 120 and/or the transmission 230.

Figure 4:
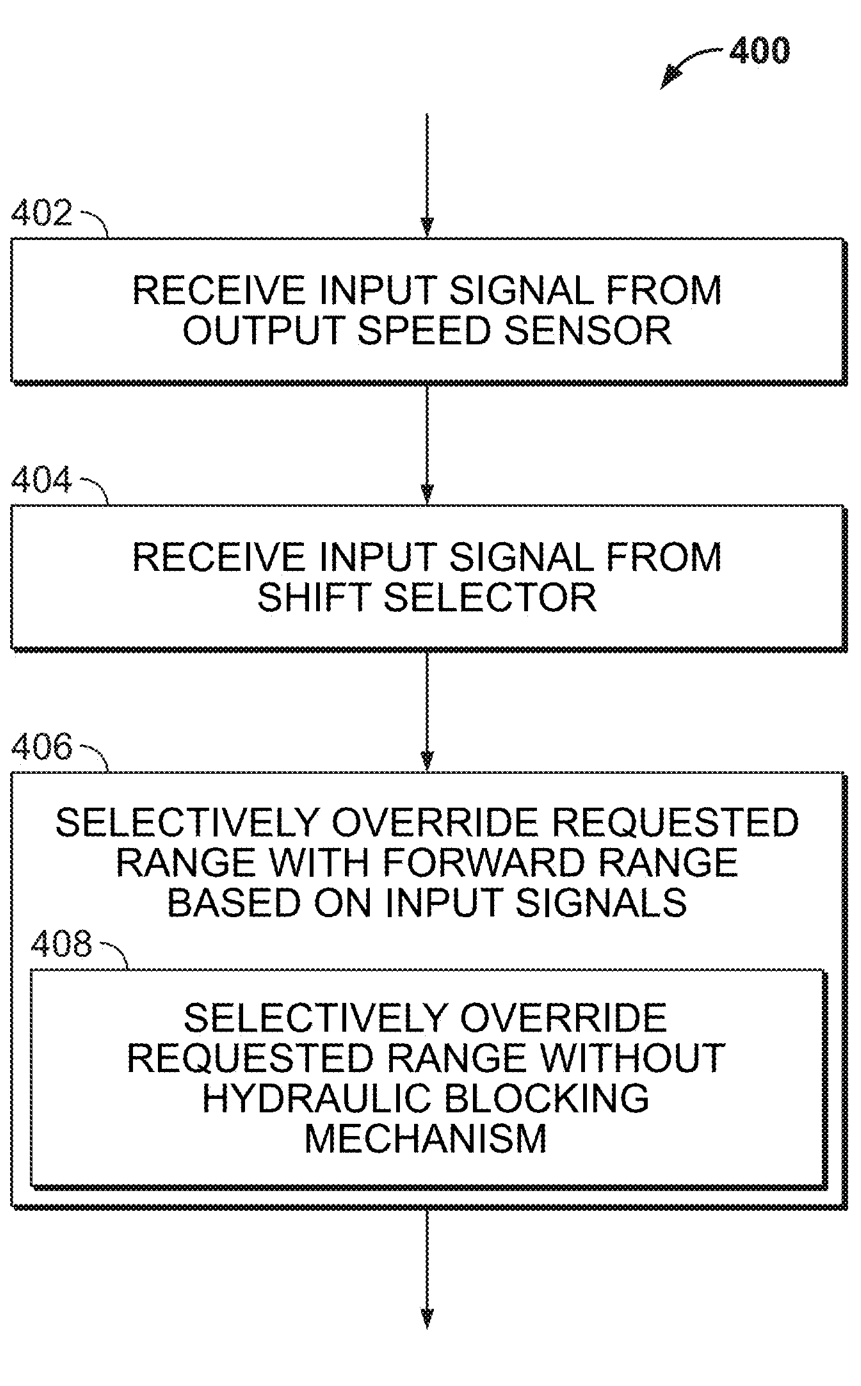
FIG. 4 is a simplified flowchart of a method of selectively overriding a transmission operating range requested by an operator using a neutral coast inhibit system (NCIS) implemented by a controller of the control system shown in FIG. 3.
Figure 5:
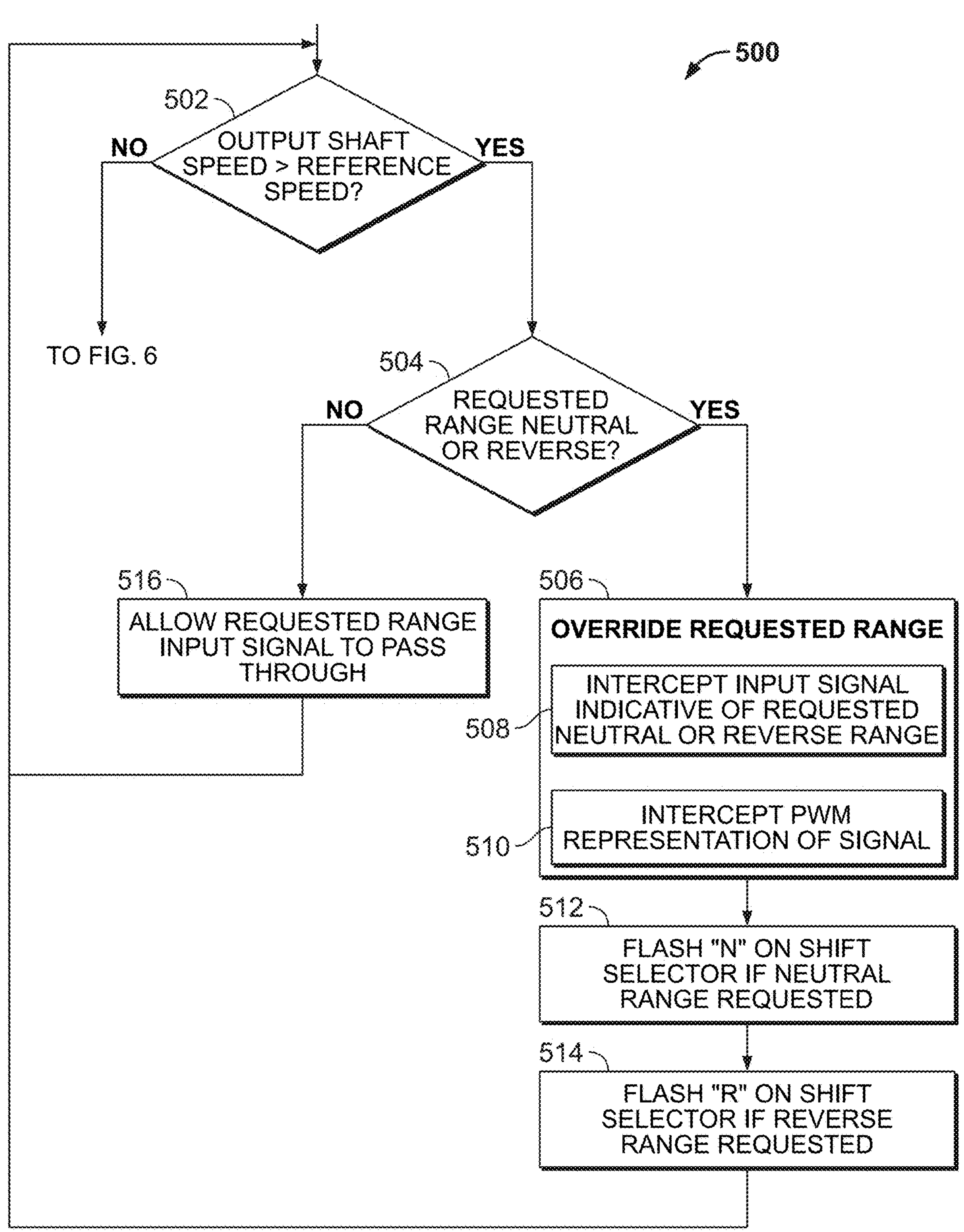
FIG. 5 is a simplified flowchart of one portion of the method of FIG. 4 performed by the controller.
Figure 6:
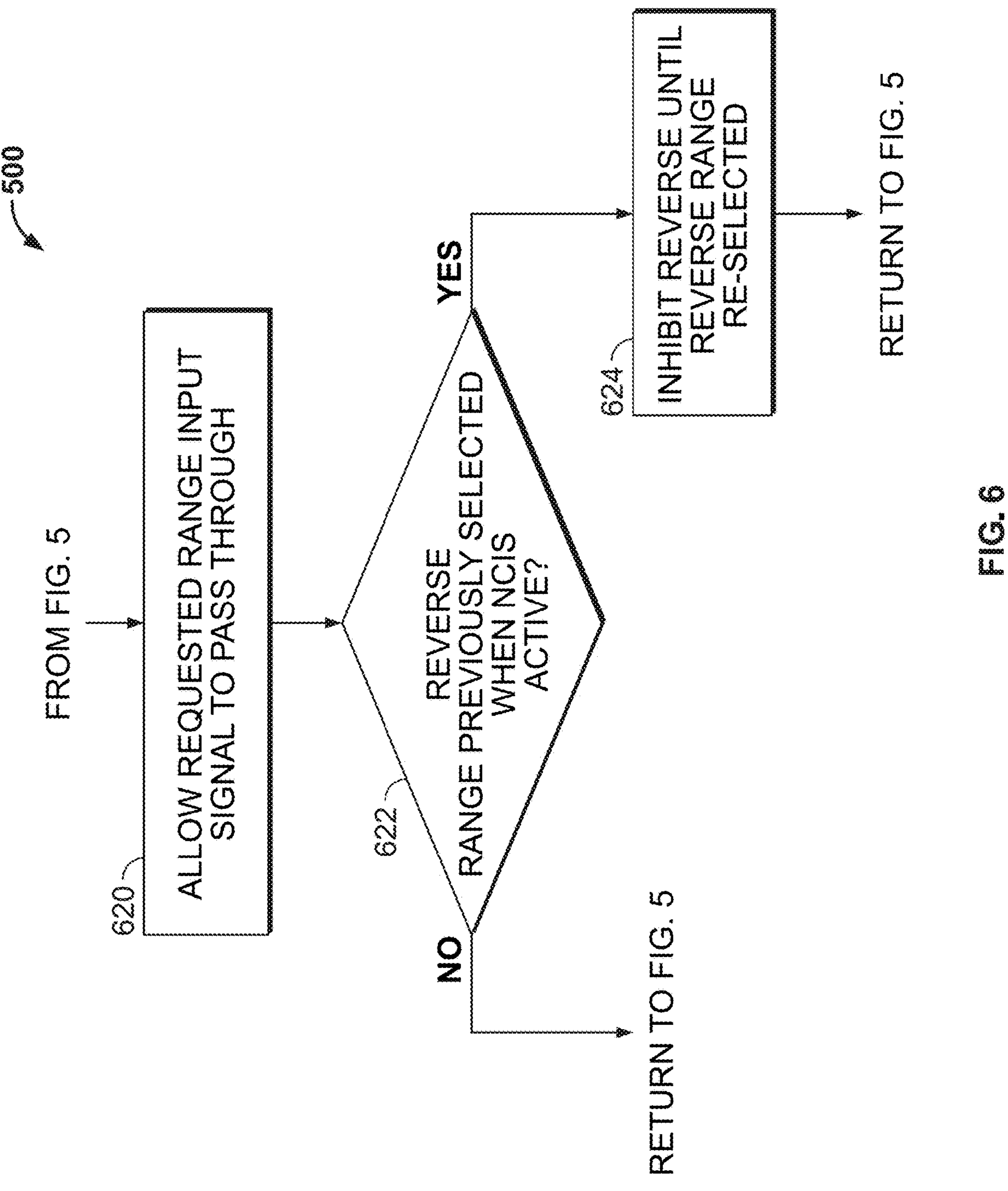
FIG. 6 is a simplified flowchart of another portion of the method of FIG. 4 performed by the controller.

The illustrative controller 302 includes a processor 304 and memory 306 having instructions stored therein. In the illustrative embodiment, as best seen in FIGS. 4-6, the instructions are executable by the processor 304 to cause the processor 304 to receive the input signals provided by the output speed sensor 150 and the shift selector 308, to determine whether the rotational speed of the output shaft 150 is greater than a reference rotational speed based on the input signal provided by the output speed sensor 150, to determine, in response to a determination that the rotational speed of the output shaft 150 is greater than the reference rotational speed, whether the requested operational range is a neutral range or a reverse range based on the input signal provided by the shift selector 308, and to override, in response to a determination that the requested operational range is a neutral range or a reverse range, the requested operational range with a forward range selection. In this manner, the NCIS is implemented by the processor 304 without utilization of a hydraulic blocking mechanism in the transmission 120 or the transmission 230.

Referring now to FIG. 1, an illustrative drive system 100 is adapted for use in one or more vehicles employed in a variety of applications. In some embodiments, the drive system 100 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the drive system 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, the drive unit 102 is embodied as, or otherwise includes, any device capable of producing rotational power to drive other components (e.g., a torque converter 108 and the transmission 120) of the drive system 100 in use thereof. In some embodiments, the drive unit 102 may be embodied as, or otherwise include, an internal combustion engine, diesel engine, electric motor, or other power-generating device. In any case, the drive unit 102 is configured to rotatably drive an output shaft 104 that is coupled to an input or pump shaft 106 of a torque converter 108.

The input or pump shaft 106 of the illustrative torque converter 108 is coupled to an impeller or pump 110 that is rotatably driven by the output shaft 104 of the drive unit 102. The torque converter 108 further includes a turbine 112 that is coupled to a turbine shaft 114. In the illustrative embodiment, the turbine shaft 114 is coupled to, or integral with, the input shaft 122 of the transmission 120.

The illustrative torque converter 108 also includes a lockup clutch 136 connected between the pump 110 and the turbine 112 of the torque converter 108. The torque converter 108 is operable in a so-called "torque converter" mode during certain operating conditions, such as during vehicle launch, low speed conditions, and certain gear shifting conditions, for example. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102. The torque converter 108 is alternatively operable in a so-called "lockup" mode during other operating conditions, such as when torque multiplication is not needed, for example. In the lockup mode, the lockup clutch 136 is engaged and the pump 110 is thereby secured directly to the turbine 112 so that the drive unit output shaft 104 is directly coupled to the input shaft 124 of the transmission 118.

In the illustrative embodiment, the transmission 120 includes an internal pump 118 configured to pressurize, and/or distribute fluid toward, one or more fluid (e.g., hydraulic fluid) circuits thereof. In some embodiments, the pump 118 may be configured to pressurize, and/or distribute fluid toward, a main circuit, a lube circuit, an electro-hydraulic control circuit, and/or any other circuit incorporated into the electro-hydraulic system 138, for example. It should be appreciated that in some embodiments, the pump 118 may be driven by a shaft 116 that is coupled to the output shaft 104 of the drive unit 102. In this arrangement, the drive unit 102 can deliver torque to the shaft 116 for driving the pump 118 and building pressure within the different circuits of the transmission 120.

The illustrative transmission 120 includes a gearing system 126 coupled between the input shaft 122 and the output shaft 124. It should be appreciated that the gearing system 126 may include one or more gear arrangements (e.g., planetary gear arrangements, epicyclic drive arrangements, etc.) that provide, or are otherwise associated with, one or more gear ratios. When used in combination with the electro-hydraulic system 138 under control by the control system 200, the gearing system 126 may provide, or otherwise be associated with, one or more operating ranges selected by an operator.

The output shaft 124 of the transmission 120 is illustratively coupled to, or otherwise integral with, a propeller shaft 128. The propeller shaft 128 is coupled to a universal joint 130 which is coupled to, and rotatably drives, the axle 132 and the wheels 134, 136. In this arrangement, the output shaft 124 drives the wheels 134, 136 through the propeller shaft 128, the universal joint 130, and the axle 132 in use of the drive system 100.

The illustrative transmission includes the electro-hydraulic system 138 that is fluidly coupled to the gearing system 126 via a number (i.e., J) of fluid paths 1401-140J, where J may be any positive integer. In the illustrative embodiment, at least one torque-transmitting mechanism 142 may be included in the electro-hydraulic system 138. The electro-hydraulic system 138 is configured to receive control signals provided by various electro-hydraulic control devices 310 (see FIG. 3), such as one or more sensors 312 and one or more flow and/or pressure control devices 314, for example. In response to those control signals, and under control by the control system 300, the electro-hydraulic system 138 selectively causes fluid to flow through one or more of the fluid paths 1401-140J to control operation (e.g., engagement and disengagement) of one or more friction devices (e.g., the at least one torque-transmitting mechanism 142) included in, or otherwise adapted for use with, the gearing system 126.

Of course, it should be appreciated that the at least one torque-transmitting mechanism 142 may include, but is not limited to, one or more brake devices, one or more torque transmitting devices, and the like. Generally, the operation (e.g., engagement and disengagement) of the at least one torque-transmitting mechanism 142 is controlled by selectively controlling the friction applied by, or otherwise associated with, each of the one or more torque-transmitting mechanisms 142, such as by controlling fluid pressure applied to each of the mechanisms, for example. In the illustrative embodiment, which is not intended to be limiting in any way, the electro-hydraulic system 138 may be coupled to, or otherwise adapted for use with, one or more brakes 320. Similar to the torque-transmitting mechanism(s) 142, each of the one or more brakes 320 may be controllably engaged and disengaged via fluid pressure supplied by the electro-hydraulic system 138. In any case, changing or shifting between the various gears of the transmission 120 is accomplished by selectively controlling the friction devices 142, 320 via control of fluid pressure within the number of fluid paths 1401-140J.

In the illustrative system 100 shown in FIG. 1, the torque converter 108 and the transmission 120 include a number of sensors configured to produce sensor signals that are indicative of one or more operating states of the torque converter 108 and the transmission 120, respectively. For example, the torque converter 108 illustratively includes a speed sensor 146 that is configured to produce a speed signal corresponding to the rotational speed of the pump shaft 106, which rotates at the same speed as the output shaft 104 of the drive unit 102 in use of the drive system 100. The speed sensor 146 is electrically connected to a pump speed input (i.e., PS) of the controller 302 via a signal path 152, and the controller 302 is operable to process the speed signal produced by the speed sensor 146 to determine the rotational speed of the pump shaft 106/drive unit output shaft 104.

In the illustrative system 100, the transmission 120 includes a speed sensor 148 that is configured to produce a speed signal corresponding to the rotational speed of the transmission input shaft 122, which rotates at the same speed as the turbine shaft 114 of the torque converter 108 in use of the system 100. The input shaft 122 of the transmission 120 may be directly coupled to, or otherwise integral with, the turbine shaft 114. Of course, it should be appreciated that the speed sensor 148 may alternatively be configured to produce a speed signal corresponding to the rotational speed of the turbine shaft 114. Regardless, the speed sensor 148 is electrically connected to a transmission input shaft speed input (i.e., TIS) of the controller 302 via a signal path 154, and the controller 302 is operable to process the speed signal produced by the speed sensor 148 to determine the rotational speed of the turbine shaft 114/transmission input shaft 124.

Further, in the illustrative system 100, the transmission 120 includes the speed sensor 150 that is configured to produce a speed signal corresponding to the rotational speed and direction of the output shaft 124 of the transmission 120. The speed sensor 150 is electrically connected to a transmission output shaft speed input (i.e., TOS) of the controller 302 via a signal path 156. The controller 302 is configured to process the speed signal produced by the speed sensor 150 to determine the rotational speed of the transmission output shaft 124.

In the illustrative embodiment, the electro-hydraulic system 138 includes one or more actuators configured to control various operations within the transmission 120. For example, the electro-hydraulic system 138 described herein illustratively includes a number of actuators (e.g., which may be included in the devices 314) that are electrically connected to a number (i.e., J) of control outputs CP1-CPJ of the controller 302 via a corresponding number of signal paths 721-72J, where J may be any positive integer as described above. Each of the actuators may receive a corresponding one of the control signals CP1-CPJ produced by the controller 302 via one of the corresponding signal paths 721-72J. In response thereto, each of the actuators may control the friction applied by each of the friction devices by controlling the pressure of fluid within one or more corresponding fluid passageway 1401-140J, thereby controlling the operation of one or more corresponding friction devices based on information provided by the various speed sensors 146, 148, and/or 150 in use of the system 100.

In the illustrative embodiment, the system 100 includes a drive unit controller 160 having an input/output port (I/O) that is electrically coupled to the drive unit 102 via a number (i.e., K) of signal paths 162, wherein K may be any positive integer. The drive unit controller 160 is operable to control and manage the overall operation of the drive unit 102. The drive unit controller 160 includes a communication port (i.e., COM) which is electrically connected to a similar communication port (i.e., COM) of the controller 302 via a number (i.e., L) of signal paths 164, wherein L may be any positive integer. It should be appreciated that the one or more signal paths 164 may be referred to collectively as a data link. Generally, the drive unit controller 160 and the transmission controller 302 are operable to share information via the one or more signal paths 164. In one embodiment, for example, the drive unit controller 160 and the transmission controller 302 are operable to share information via the one or more signal paths 164 in the form of one or more messages in accordance with a Society of Automotive Engineers (SAE) J-1939 communications protocol. Of course, it should be appreciated that this disclosure contemplates other embodiments in which the drive unit controller 160 and the transmission controller 302 are operable to share information via the one or more signal paths 164 in accordance with one or more other communication protocols (e.g., from a conventional databus such as J1587 data bus, J1939 data bus, IESCAN data bus, GMLAN, Mercedes PT-CAN).

Referring now to FIG. 2, the powertrain 210 includes the drive unit 212 (shown in phantom) to generate rotational power and a transaxle 220 coupled to the drive unit 212 to receive rotational power therefrom and transmit rotational power to the wheels 204. The drive unit 212 may be identical or substantially identical to the drive unit 102, at least in some embodiments. In some embodiments, the vehicle 200 is embodied as, or otherwise includes, an electric vehicle. In one example, the vehicle 200 is embodied as, or otherwise includes, a medium or heavy-duty electric truck or electric bus, and the powertrain 210 is employed in lieu of one or more conventional powertrain(s) associated with one or more internal combustion engine configuration(s).

The illustrative transaxle 220 is embodied as, or otherwise include, any collection of devices capable of receiving rotational power from the drive unit 212 and transmitting rotational power to the wheels 204. In the illustrative embodiment, the transaxle 220 includes a transmission 230, a differential 240 (shown in phantom in FIG. 2) coupled to the transmission 230, and an axle assembly 250 (shown in phantom in FIG. 2) coupled to the differential 240. The transmission 230 may be identical or substantially identical to the transmission 120, at least in some embodiments.

Figure 3:
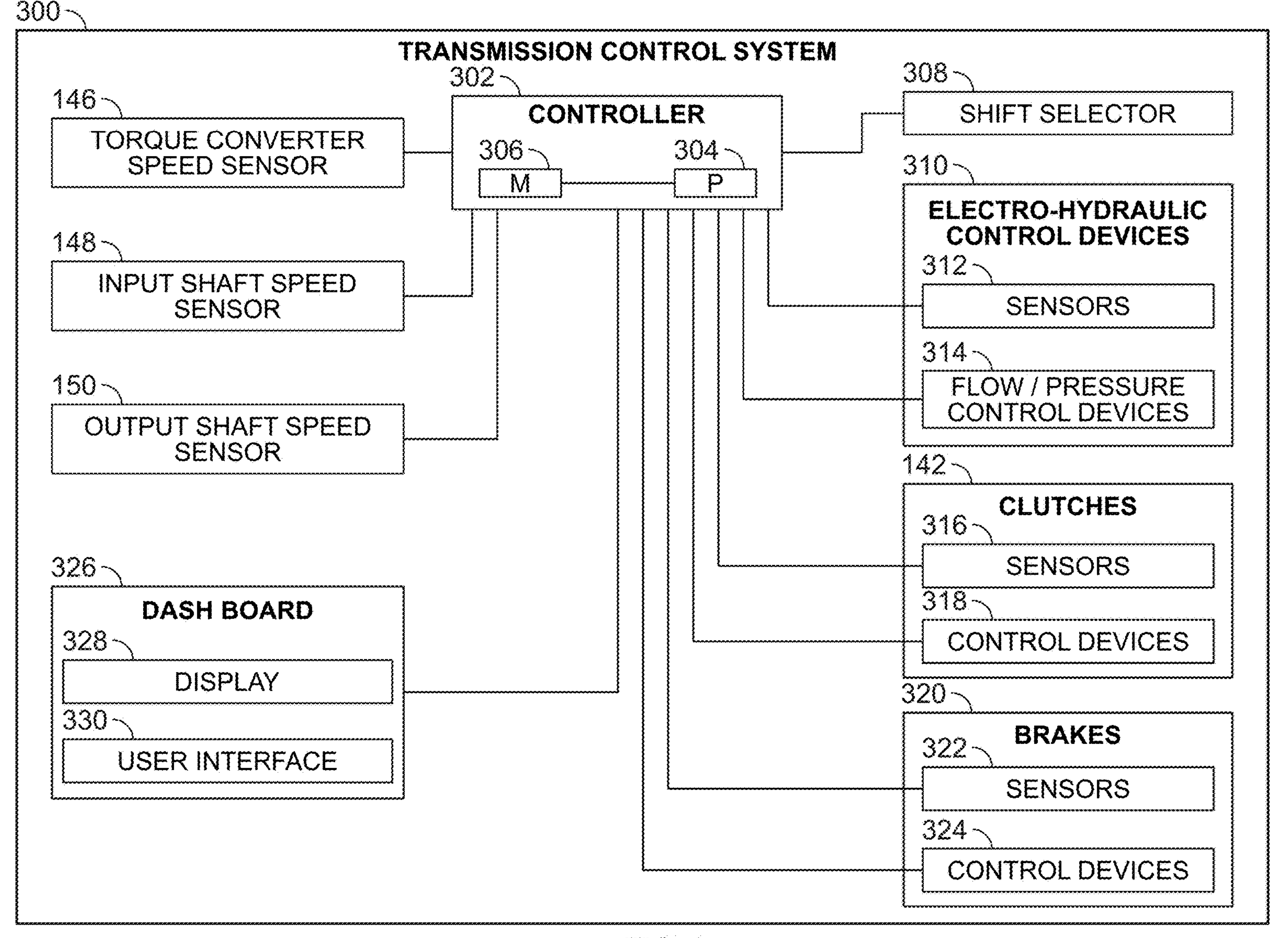
FIG. 3 is a diagrammatic view of a transmission control system included in a transmission of the drive system of FIG. 1 or the powertrain of FIG. 2.

Referring now to FIG. 3, in the illustrative embodiment, the transmission control system 300 includes the sensors 146, 148, 150, the controller 302, the shift selector 308, one or more electro-hydraulic control devices 310, one or more torque-transmitting mechanisms 142, one or more brake(s) 320, and a dashboard 326. Each of the devices 146, 148, 150, 308, 310, 142, 320, 326 is communicatively coupled to the controller 302. In some embodiments, the controller 302 may be communicatively coupled to (i) sensors 312 and/or flow/pressure control devices 314 of the electro-hydraulic control devices 310, (ii) sensors 316 and/or control devices 318 of the torque transmitting mechanism(s) 142, and (iii) sensors 322 and/or control devices 324 of the brake(s) 320.

The processor 304 of the illustrative controller 302 may be embodied as, or otherwise include, any type of processor, controller, or other compute circuit capable of performing various tasks such as compute functions and/or controlling the functions of the transmissions 120, 230. For example, the processor 304 may be embodied as a single or multi-core processor(s), a microcontroller, or other processor or processing/controlling circuit. In some embodiments, the processor 304 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 304 may be embodied as, or otherwise include, a high-power processor, an accelerator co-processor, or a storage controller. In some embodiments still, the processor 304 may include more than one processor, controller, or compute circuit.

The memory device 306 of the illustrative controller 302 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 306 may be embodied as a block addressable memory, such as those based on NAND or NOR technologies. The memory device 306 may also include future generation nonvolatile devices, such as a three dimensional crosspoint memory device (e.g., Intel 3D XPoint™ memory), or other byte addressable write-in-place nonvolatile memory devices. In some embodiments, the memory device 306 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

In the illustrative embodiment, as discussed above, the shift selector 308 is configured to provide an input signal to the controller 302 indicative of an operational range of the transmission 120 and/or the transmission 230 requested by the user. The illustrative input signal provided to the controller 302 by the shift selector 308 is indicative of, but not limited to, one of the following operational ranges requested by the user: a reverse range, a neutral range, a park range, and a forward range. In some embodiments, the input signal may be transmitted over a controller area network (CAN) such that the input signal is a CAN signal. Additionally, in some embodiments, the input signal is a pulse width modulation (PWM) signal that may be issued along with a CAN signal. As such, in some embodiments, the input signal provided by the shift selector 308 may take the form of both a CAN message and a PWM signal. Additionally, in some embodiments, the shift selector 308 may include, or otherwise be embodied as, one or more operator input devices configured to provide input indicative of one or more operational characteristics of the transmission 120, 230 and/or the vehicle 200 associated with the transmission 120, 230.

In some embodiments, the torque-transmitting mechanism(s) 142 include one or more sensors 316 and one or more control devices 318, each of which is communicatively coupled to the controller 302. The sensor(s) 316 may include, or otherwise be embodied as, any electrical device or collection of electrical devices capable of providing input data indicative of an operational characteristic(s) of the mechanism(s) 142, such as measuring clutch pressure delivered to the mechanism(s) 142 during a shift from one operational mode of the transmission 120, 230 to another, for example. Additionally, in some embodiments, the sensor (s) 316 may include a proximity sensor, such as a capacitive proximity sensor, an inductive proximity sensor, a hall effect sensor, or the like. The control device(s) 318 may include, or otherwise be embodied as, any hydro-mechanical or electro-mechanical device or collection of such devices capable of controlling fluid pressure delivery to the mechanism(s) 142, such as one or more pressure control solenoids, trim systems, trim valves, on/off solenoids, shift valves, logic valves, or the like.

In some embodiments, the brake(s) 320 include one or more sensors 322 and one or more control devices 324, each of which is communicatively coupled to the controller 302. The sensor(s) 322 may include, or otherwise be embodied as, any electrical device or collection of electrical devices capable of providing input data indicative of an operational characteristic(s) of the brake(s) 320, such as measuring clutch pressure delivered to the brake(s) 320 during a shift from one operational mode of the transmission 120, 230 to another, for example. Additionally, in some embodiments, the sensor(s) 322 may include a proximity sensor, such as a capacitive proximity sensor, an inductive proximity sensor, a hall effect sensor, or the like. The control device(s) 324 may include, or otherwise be embodied as, any hydro-mechanical or electro-mechanical device or collection of such devices capable of controlling fluid pressure delivery to the brake(s) 320, such as one or more pressure control solenoids, trim systems, trim valves, on/off solenoids, shift valves, logic valves, or the like.

The dashboard 326 of the illustrative control system 300 includes a display 328 and a user interface 330. The display 328 is configured to output or display various indications, messages, and/or prompts to an operator, which may be generated by the control system 300. The user interface 330 is configured to provide various inputs to the control system 300 based on various actions, which may include actions performed by an operator.

In some embodiments, the controller 302 may establish an environment (not shown) during operation. The environment may include one or more modules configured to perform various functionalities and/or portions of the method 400 described below. Each of the module(s), logic, and other components of the environment may be embodied as hardware, firmware, software, or a combination thereof. As such, in some embodiments, one or more modules of the environment may be embodied as circuitry or a collection of electrical devices. In such embodiments, one or more of the modules may form a portion of the processor(s) 304 and/or other components of the controller 302. Additionally, in some embodiments, one or more of the modules may form a portion of another module and/or one or more of the modules may be independent of one another. Further, in some embodiments, one or more of the modules of the environment may be embodied as virtualized hardware components or emulated architecture, which may be established and maintained by the processor(s) 304 or other components of the controller 302.

Referring now to FIG. 4, an illustrative method 400 of selectively overriding a neutral or reverse operating range requested by an operator in use of the transmission 120, 230 may include, or otherwise be embodied as, a set of instructions that are executable by the controller 302. In some embodiments, the set of instructions are executable by the controller 302 to selectively enable/activate, or selectively disable/de-activate, the NCIS. In any case, the method 400 corresponds to, or is otherwise associated with, performance of the blocks described below in the illustrative sequence of FIG. 4. It should be appreciated, however, that the method 400 may be performed in one or more sequences different from the illustrative sequence.

The illustrative method 400 begins with block 402. In block 402, the controller 302 receives the input signal provided by the output speed sensor 150 indicative of the rotational speed of the output shaft 124. Of course, in some embodiments, it should be appreciated that the controller 302 monitors the actual speed of the output shaft 124 in real-time based on the input signal received in block 402. From block 402, the method 400 proceeds to block 404.

In block 404 of the illustrative method 400, the controller 302 receives the input signal provided by the shift selector 308 indicative of the operating range of the transmission 120, 230 requested or selected by the operator. Of course, in some embodiments, it should be appreciated that the controller 302 monitors the operating range requested or selected by the operator using the shift selector 308 in real-time based on the input signal received in block 404. From block 404, the method 400 proceeds to block 406.

In block 406 of the illustrative method 400, the controller 302 selectively overrides the operating range requested or selected by the operator with a forward range based on the input signals received in blocks 402 and 404. To do so, as described in greater detail below, the controller 302 performs the method 500. Furthermore, in the illustrative embodiment, to perform block 406, the controller 302 performs block 408. In block 408, the controller 302 selectively overrides the operating range requested or selected by the operator with a forward range based on the input signals received in blocks 402 and 404 without utilization of a hydraulic blocking mechanism.

Referring now to FIG. 5, an illustrative method 500 of performing block 406 discussed above includes, or is otherwise embodied as, a set of instructions that are executable by the controller 302. In some embodiments, the set of instructions are executable by the controller 302 to selectively enable/activate, or selectively disable/de-activate, the NCIS. In any case, the method 500 corresponds to, or is otherwise associated with, performance of the blocks described below in the illustrative sequence of FIG. 5. It should be appreciated, however, that the method 500 may be performed in one or more sequences different from the illustrative sequence.

The illustrative method 500 begins with block 502. In block 502, the controller 302 determines, based on the input signal from the output speed sensor 150 received in block 402, whether the rotational speed of the output shaft 124 is greater than or exceeds a reference rotational speed. In some embodiments, the reference rotational speed may be a predetermined rotational speed stored in the memory 304 of the controller 302, such as in one or more lookup tables stored in the memory 304, for example. Additionally, in some embodiments, the reference rotational speed is at least 600 rpm. If the controller 302 determines in block 502 that the speed of the output shaft 124 is greater than the reference speed, the method 500 proceeds to block 504.

In block 504 of the illustrative method 500, the controller 302 determines, based on the input signal from the shift selector 308 received in block 404, whether the operational range requested by the user is a neutral range or a reverse range. In some embodiments, the transmission 120, 230 may be operable in one or more neutral ranges and one or more reverse ranges, and the controller 302 may determine in block 504 whether the requested operational range is any one of the neutral range(s) or the reverse range(s). If the controller 302 determines in block 504 that the requested range is a neutral range or a reverse range, the method 500 proceeds to block 506.

In block 506 of the illustrative method 500, based on the affirmative (i.e., "yes") determinations made in blocks 502, 504, the controller 302 overrides the requested reverse or neutral range with a forward range selection. To do so, in the illustrative embodiment, the controller 302 performs blocks 508 and 510. In block 508, the controller 302 intercepts the input signal provided by the shift selector 308 indicative of the requested reverse or neutral range to prevent the input signal from passing through the set of instructions stored in the memory 304. In block 510, the controller 302 intercepts a pulse-width modulation (PWM) representation of the input signal provided by the shift selector 308 indicative of the requested reverse or neutral range to prevent the PWM representation of the signal from passing through the set of instructions stored in the memory 304. Additionally, in some embodiments, in block 510, the controller 302 intercepts a CAN message corresponding to the input signal to prevent the CAN message from passing through the set of instructions stored in the memory 304. As a result of performing the blocks 506, 508, 510 it should be appreciated that the controller 302 effectively prevents a high output speed shift to neutral (which may result from operator selection of a neutral range or a reverse range at high output speed using the shift selector 308) that might cause damage to the hardware of the transmission 120, 230. Additionally, in some embodiments, performance of blocks 506, 508, 510 corresponds to, or is otherwise associated with, activation or enablement of the NCIS. From block 506, the method 500 proceeds to one of blocks 512, 514.

In block 512 of the illustrative method 500, the controller 302 flashes "N" on the shift selector 308 when the input signal received in block 404 is indicative of a neutral range requested by the operator. It should be appreciated that, in block 512, the controller 302 provides an alert or notification to the operator of the range that has been overridden in block 506, presuming that the overridden range is a neutral range requested by the operator. Of course, in the event the input signal received in block 404 is not indicative of a neutral range, block 512 may be omitted from the method 500. In the illustrative method 500, from block 512, the method 500 proceeds to block 514.

In block 514 of the illustrative method 500, the controller 302 flashes "R" on the shift selector 308 when the input signal received in block 404 is indicative of a reverse range requested by the operator. It should be appreciated that, in block 514, the controller 302 provides an alert or notification to the operator of the range that has been overridden in block 506, presuming that the overridden range is a reverse range requested by the operator. Of course, in the event the input signal received in block 404 is not indicative of a reverse range, block 514 may be omitted from the method 500. In the illustrative method 500, from block 514, the method 500 returns to block 502.

Returning to block 504, if the controller 302 determines in block 504 that the requested range is not a neutral range or a reverse range, the method 500 proceeds to block 516. In block 516, the controller 302 allows the input signal received from the shift selector 308 in block 404 to pass through the set of instructions stored in the memory 304 without being overridden. As such, in block 516, it should be appreciated that the controller 302 does not override, intercept, or modify the input signal received from the shift selector 308 in block 404. In the illustrative method, from block 516, the method 500 returns to block 502.

Referring now to FIG. 6, additional features or steps of the method 500 are depicted. Those features or steps may be embodied as, or otherwise include, a set of instructions that are executable by the controller 302. The method 500 corresponds to, or is otherwise associated with, performance of the blocks described below in the illustrative sequence of FIG. 6. It should be appreciated, however, that the method 500 may be performed in one or more sequences different from the illustrative sequence.

Returning to block 502, if the controller 302 determines in block 502 that the rotational speed of the output shaft 124 is not greater than the reference rotational speed, the method 500 proceeds to block 620. In block 620, the controller 302 allows the input signal received from the shift selector 308 in block 404 to pass through the set of instructions stored in the memory 304 without being overridden. As such, in block 620, it should be appreciated that the controller 302 does not override, intercept, or modify the input signal received from the shift selector 308 in block 404. From block 620, the method 500 proceeds to block 622.

In block 622 of the illustrative method 500, the controller 302 determines whether a reverse range was requested in a previous operational state in which the NCIS was active. If the controller 302 determines that a reverse range was requested in a previous operational state in which the NCIS was active, the method 500 proceeds to block 624.

In block 624 of the illustrative method 500, the controller 302 inhibits attainment of the reverse range until the controller 302 receives the input signal from the shift selector 308 indicative of re-selection of the reverse range. In the illustrative method 500, from block 624, the method 500 returns to block 502.

Returning to block 622, if the controller 302 determines in block 622 that a reverse range was not requested in a previous operational state in which the NCIS was active, the method 500 returns to block 502.

In some embodiments, when the controller 302 performs blocks 506, 508, 510 to activate or enable the NCIS, all requests received by the controller 302 from the shift selector 308 to shift into a neutral range are blocked. However, in some embodiments, certain automatic shifts originating from a source other than the shift selector 308 into a neutral range may be permitted despite activation or enablement of the NCIS. In one example, auto-neutral shifts (e.g., automatic shifts into a neutral range when the vehicle is stopped) may be permitted despite activation or enablement of the NCIS.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission comprising:

an input shaft to receive torque from a drive unit, an output shaft to transmit torque to a load, and a control system including an output speed sensor to provide an input signal indicative of a rotational speed of the output shaft, a shift selector to provide an input signal indicative of a requested operational range of the transmission, and a controller communicatively coupled to the output speed sensor and the shift selector, wherein the controller includes a processor and memory having instructions stored therein that are executable by the processor to cause the processor to receive the input signals provided by the output speed sensor and the shift selector, to determine whether the rotational speed of the output shaft is greater than a reference rotational speed based on the input signal provided by the output speed sensor, to determine, in response to a determination that the rotational speed of the output shaft is greater than the reference rotational speed, whether the requested operational range is a neutral range or a reverse range based on the input signal provided by the shift selector, to override, in response to a determination that the requested operational range is a neutral range or a reverse range, the requested operational range with a forward range selection, and to, in response to the determination that the requested operational range is a neutral range or a reverse range, intercept a pulse-width modulation representation of the input signal provided by the shift selector indicative of the requested neutral or reverse range.

2. The transmission of claim 1, wherein the instructions are executable by the processor to cause the processor to, in response to the determination that the requested operational range is a neutral range, flash "N" on the shift selector when the input signal provided by the shift selector is indicative of the requested neutral range.

3. The transmission of claim 1, wherein the instructions are executable by the processor to cause the processor to, in response to the determination that the requested operational range is a reverse range, flash "R" on the shift selector when the input signal provided by the shift selector is indicative of the requested reverse range.

4. The transmission of claim 1, wherein the instructions are executable by the processor to cause the processor to, in response to a determination that the requested operational range is not a neutral range or a reverse range, allow the input signal provided by the shift selector to pass through without being overridden.

5. The transmission of claim 1, wherein the reference rotational speed is at least 600 rpm.

6. The transmission of claim 1, wherein the instructions are executable by the processor to cause the processor to, in response to a determination that the rotational speed of the output shaft is not greater than the reference rotational speed, allow the input signal provided by the shift selector to pass through without being overridden.

7. The transmission of claim 6, wherein the instructions are executable by the processor to cause the processor to determine, in response to allowing the input signal provided by the shift selector to pass through, whether a reverse range was selected in a previous operational state in which a neutral coast inhibit system of the transmission was active.

8. The transmission of claim 7, wherein the instructions are executable by the processor to cause the processor to, in response to a determination that the reverse range was selected in the previous operational state, inhibit attainment of the reverse range until the processor receives the input signal from the shift selector indicative of re-selection of the reverse range.

9. A transmission comprising:

an input shaft to receive torque from a drive unit, an output shaft to transmit torque to a load, and a control system including an output speed sensor to provide an input signal indicative of a rotational speed of the output shaft, a shift selector to provide an input signal indicative of a requested operational range of the transmission, and a controller communicatively coupled to the output speed sensor and the shift selector, wherein:

the controller includes a processor and memory having instructions stored therein that are executable by the processor to cause the processor to receive the input signals provided by the output speed sensor and the shift selector, to determine whether the rotational speed of the output shaft is greater than 600 rpm based on the input signal provided by the output speed sensor, to, in response to a determination that the rotational speed of the output shaft is not greater than 600 rpm, allow the input signal provided by the shift selector to pass through without being overridden, to determine, in response to allowing the input signal provided by the shift selector to pass through, whether a reverse range was requested in a previous operational state in which a neutral coast inhibit system of the transmission was active, and to, in response to the determination that the rotational speed of the output shaft is greater than 600 rpm, override a requested neutral operational range with a forward range selection based on the input signals provided by the output speed sensor and the shift selector.

10. A transmission comprising:

an input shaft to receive torque from a drive unit, an output shaft to transmit torque to a load, and a control system including an output speed sensor to provide an input signal indicative of a rotational speed of the output shaft, a shift selector to provide an input signal indicative of a requested operational range of the transmission, and a controller communicatively coupled to the output speed sensor and the shift selector, wherein:

the controller includes a processor and memory having instructions stored therein that are executable by the processor to cause the processor to receive the input signals provided by the output speed sensor and the shift selector, to determine whether the rotational speed of the output shaft is greater than a reference rotational speed based on the input signal provided by the output speed sensor, to selectively override a requested operational range with a forward range selection based on the input signals provided by the output speed sensor and the shift selector, to, in response to a determination that the requested operational range is a neutral range, flash "N" on the shift selector when the input signal provided by the shift selector is indicative of the requested neutral range, to, in response to a determination that the rotational speed of the output shaft is not greater than the reference rotational speed, allow the input signal provided by the shift selector to pass through without being overridden, and to determine, in response to allowing the input signal provided by the shift selector to pass through, whether a reverse range was requested in a previous operational state in which a neutral coast inhibit system of the transmission was active.

* * * * *